United States Patent [19]
McRobert et al.

[11] Patent Number: 5,874,930
[45] Date of Patent: Feb. 23, 1999

[54] SERIAL DISPLAY DRIVE FOR ELECTRONIC SYSTEMS

[75] Inventors: Stephen McRobert, Sunnyvale; Rudolph J. Sterner, Los Altos, both of Calif.

[73] Assignee: Advanced Micro Devices, Inc., Sunnyvale, Calif.

[21] Appl. No.: 628,271

[22] Filed: Apr. 5, 1996

[51] Int. Cl.[6] ..................................................... G09G 3/06
[52] U.S. Cl. ................................ 345/44; 345/46; 345/35; 345/39
[58] Field of Search .................................. 345/35, 36, 38, 345/44, 45, 46, 47, 48, 50, 51, 52, 87, 82, 84, 39; 370/445, 408

[56] References Cited

U.S. PATENT DOCUMENTS

| | | |
|---|---|---|
| 3,909,822 | 9/1975 | Lee et al. .................................... 345/73 |
| 5,039,978 | 8/1991 | Kronberg .................................... 345/38 |
| 5,293,375 | 3/1994 | Moorwood et al. ..................... 370/445 |

*Primary Examiner*—Xiao Wu
*Attorney, Agent, or Firm*—Fliesler, Dubb, Meyer & Lovejoy LLP

[57] ABSTRACT

A serial display drive for an electronic system including control circuitry that manipulates a serial clock signal that synchronizes each of a plurality of status bits in a serial data stream. The serial display drive circuitry includes a set of indicating elements for displaying the status information and means for switching the indicating elements. The control circuitry periodically stops the serial clock signal to provide a status update interval for each of the indicating elements and to obviate the need for a register element and strobe signal to hold data for the light-emitting elements. In another embodiment, the control circuitry generates bar graph displays.

44 Claims, 6 Drawing Sheets

SERIAL DISPLAY DRIVE FOR ELECTRONIC SYSTEMS

BACKGROUND OF THE INVENTION

1. Field of Invention

The present invention pertains to the field of displays for electronic systems. More particularly, this invention relates to a low cost low pin count serial display drive mechanism for electronic systems.

2. Art Background

Prior electronic systems that perform relatively complex functions commonly employ highly integrated specialized integrated circuit chips. Typically, such specialized integrated circuit chips are designed and optimized for performing the required specialized function. For example, prior communication systems typically employ one or more specialized integrated circuit chips that perform functions required by a particular communication protocol.

One such specialized integrated circuit chip is the AM79C981 Ethernet control chip manufactured by Advanced Micro Devices, Inc. of Sunnyvale, Calif. This highly integrated and specialized control chip implements the communication functions required to perform communication repeater functions for a set of ethernet communication links.

In addition, prior electronic systems such as communication repeater hubs commonly provide a status display mechanism. Such a status display mechanism usually provides a variety of application specific indicators according to the specific requirements of the electronic system. For example, a status display for a communication repeater hub typically provides link activity indicators for the individual communication links.

Prior lower cost electronic systems usually provide such application specific indications via a set of illuminating elements such as light-emitting diodes (LEDs). For example, prior communication repeater hubs usually provide a set of communication link status indicator lights in the form of LEDs.

Typically, such application specific status information is maintained by the specialized integrated circuit chips. Such specialized chips typically supply the status information to the status display on a continuous basis for display. In addition, prior specialized integrated circuit chips commonly use serial data streams to supply data to the status display indicators.

For example, the AM79C981 Ethernet control chip generates a serial data stream that carries the status information for the corresponding communication links. The AM79C981 Ethernet control chip also generates a continuous clock signal and a strobe signal for externally latching and holding the contents of the serial data. Prior repeater hubs that employ the AM89C981 usually include a shift register that assembles the serial data stream under control of the continuous clock and also provide latch circuit that holds the status information under control of the strobe signal. Typically, the strobe signal periodically loads the latch from the Q outputs of the shift register such that the output of the latch drives the LEDs that provide the status display.

Unfortunately, such external shift register and external latch components usually increases the overall cost of such a communication repeater hub. Moreover, extra input/output pins are usually required on the control chip to provide the serial data stream, the serial clock, and the strobe signal. Such extra input/output pins usually increase the manufacturing costs of such highly integrated control chips. In addition, such extra pins may not be available without implementing the control chip in a higher pin count package that is much more expensive than would otherwise be necessary.

SUMMARY AND OBJECTS OF THE INVENTION

One object of the present invention is to provide a serial display drive that minimizes the input/output pin requirements of a control chip.

Another object of the present invention is to provide a serial display drive that does not require both an external shift register and an external latch.

A further object of the present invention is to minimize the parts count and manufacturing costs for an electronic system that employs highly integrated control chips.

These and other objects are provided by a serial display drive for an electronic system including control circuitry that generates a serial data stream carrying a set of status information. The control circuitry manipulates a serial clock signal that synchronizes each of a plurality of status bits in the serial data stream. The serial display drive circuitry includes a set of indicating elements for displaying the status information and means for switching the indicating elements such that an on/off state of each indicating element is controlled by a corresponding status bit in the serial data stream. The control circuitry periodically stops the serial clock signal to provide a status update interval for each of the indicating elements and to obviate the need for a register element to hold data for the indicating elements. In another embodiment, the control circuitry manipulates the serial clock signal in relation to a serial data signal to generate a bar graph display without the need for latching circuitry.

Other objects, features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
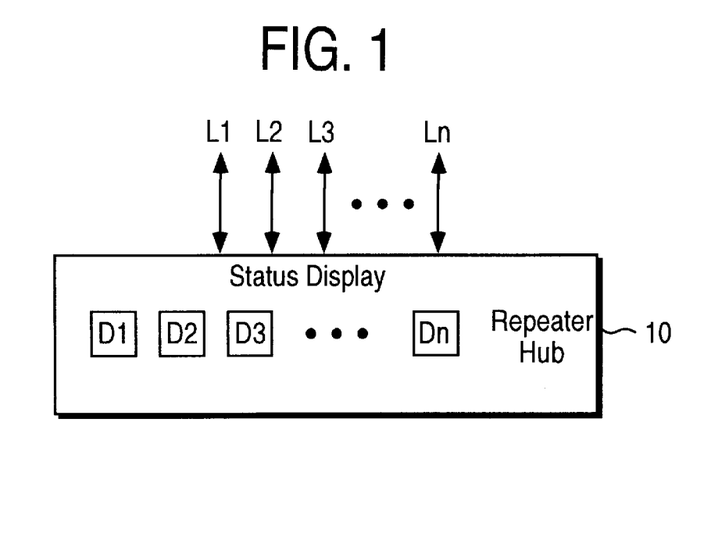
FIG. 1 illustrates a repeater hub including one embodiment of a link status display.

FIG. 1 illustrates a repeater hub 10 including one embodiment of a status display. The status display includes a set of light-emitting diodes (LEDs) D1–Dn. The repeater hub 10 enables communication via a set of communication links L1–Ln. The individual LEDs D1–Dn provide status information for the individual communication links L1–Ln.

Alternatively, the LEDs D1–Dn may be replaced by a wide variety of other types of light emitting elements such as incandescent bulbs. In addition, light reflecting means such as liquid crystal display (LCD) elements may be employed to display status information.

In one embodiment, the LEDs D1–Dn indicate communication packet transmission activity on the corresponding communication links L1–Ln. In another embodiment, the LEDs D1–Dn indicate collisions on the corresponding communication links L1–Ln. In general, the LEDs D1–Dn provide status indicators or attribute indicators for the communication links L1–Ln.

Figure 2:
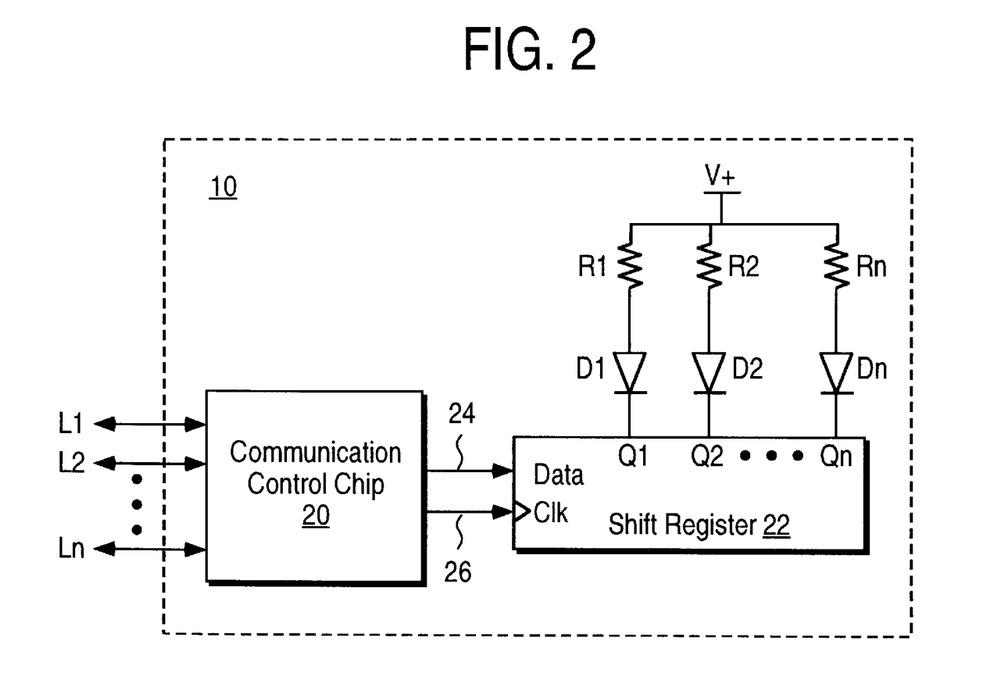
FIG. 2 illustrates one embodiment of the serial display drive circuitry of the repeater hub.

FIG. 2 illustrates one embodiment of the serial display drive circuitry of the repeater hub 10. The serial display drive circuitry in the repeater hub 10 includes a shift register 22, the LEDs D1–Dn, and a set of resistors R1–Rn. The shift register 22 provides a set of outputs Q1 through Qn that control the on/off or illuminate/non-illuminate states of the LEDs D1–Dn. The shift register 22 may be a custom device or a standard device such as a 74164.

Standard devices have the advantages of being readily available and relatively inexpensive. In addition, standard devices enable more current flow through the LEDs D1–Dn if the outputs Q1–Qn sink electrical current in the on state as shown in FIG. 2.

The repeater hub 10 contains a communication control chip 20 that enables communication via the communication link L1–Ln. For one embodiment, the communication control chip 20 enables communication according to the ethernet communication protocol on the communication links L1–Ln.

The communication control chip 20 generates a serial data stream on a signal line 24 which is coupled to the data (DATA) input to the shift register 22. The serial data stream on the signal line 24 contains status bits for the communication links L1–Ln. The communication control chip 20 also generates the serial clock signal on a signal line 26 which drives the clock input (CLK) of the shift register 22. The signal lines 24 and 26 are driven by a pair of output pins of the communication control chip 20. The arrangement shown obviates the need for an output pin on the control chip 20 that provides a strobe signal as is found in the prior art.

The serial clock signal 26 loads or shifts the serial data stream on the signal 24 into the shift register 22. The outputs Q1 through Qn reflect the data stored in the shift register 22. The LEDs D1–Dn are coupled between the outputs Q1 through Qn of the shift register 22 and a supply voltage V+.

Once loaded into the shift register 22, the serial data bits carried by the serial data stream on the serial data line 24 determine the voltage level of the corresponding output Q1 through Qn. A bit of the serial data stream that corresponds to a logical "0" or a low voltage level on the signal line 24 causes the corresponding output Q1 through Qn of the shift register 22 to transition to a low voltage level. On the other hand, a bit of the serial data stream that corresponds to a logical "11" or a high voltage level on the signal line 24 causes the corresponding output Q1 through Qn of the shift register 22 to transition to a high voltage level.

The outputs Q1 through Qn of the shift register 22 having a low voltage level cause the illumination of the corresponding LEDs D1–Dn. The illumination results from electrical current flow through the LEDs D1–Dn between the V+ supply and the low outputs Q1 through Qn of the shift register 22. The resistors R1–Rn limit the electrical current flow and protect the LEDs D1–Dn from excess current damage.

The outputs Q1 through Qn of the shift register 22 having a high voltage level do not cause electrical current flow through corresponding LEDs D1–Dn. The LEDs D1–Dn driven by outputs Q1 through Qn of the shift register 22 having a high voltage level therefor do not illuminate.

The communication control chip 20 manipulates the serial clock signal on the signal line 26 to ensure that the link status bits can be perceived by a viewer through the LEDs D1–Dn. The communication control chip 20 also manipulates the serial clock signal on the signal line 26 to obviate the need for an external register to latch the outputs Q1 through Qn and a strobe signal for the latch as is found in the prior art.

Figure 3:
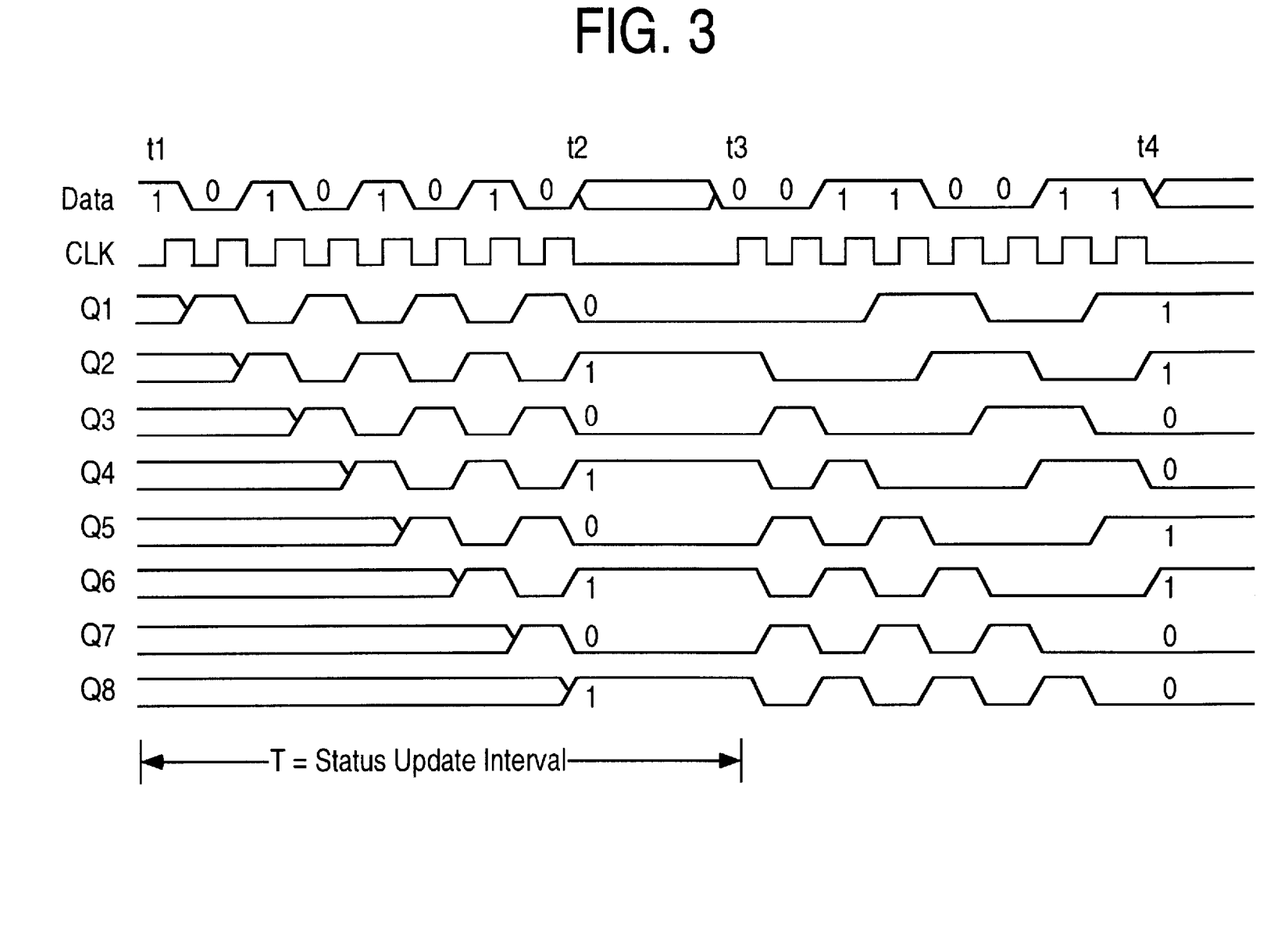
FIG. 3 illustrates the timing of the serial data stream (DATA) and the serial clock signal (CLK) that control the serial display drive circuitry.

FIG. 3 illustrates the timing of the serial data stream (DATA) and the serial clock signal (CLK) on the signal lines 24 and 26. The serial data stream carries groups of n link status bits that correspond to the communication links L1–Ln. A first group of n link status bits is carried between times t1 and t2 and a second group of n link status bits is carried between times t3 and t4.

The individual status bits of each group may indicate, for example, collisions on the corresponding communication link L1–Ln. The individual status bits may also indicate the transfer of a communication packet on the corresponding communication link L1–Ln or may indicate some other attribute of the corresponding communication link L1–Ln.

Between time t1 and t2 the rising edges of the serial clock signal 26 shift individual status bits of the first group into the shift register 22. After all of the status bits of the first group are shifted into the shift register 22 at time t2, the communication control chip 20 stops the serial clock signal on the signal line 26. At time t2, the LEDs D1–Dn indicate on, off, on, off, on, off, on, off, respectively.

The serial clock signal 26 remains stopped between times t2 and t3 such that the outputs Q1 through Qn of the shift register 22 remain unchanged. The communication control chip 20 resumes the serial clock signal at time t3 to update the serial display provided by the LEDs D1–Dn with the second group of status bits. At time t4, the LEDs D1–Dn indicate off, off, on, on, off, off, on, on, respectively. Note that this is just one example. This circuit can display any pattern of on or off signals.

The number of pulses in a burst of the serial clock signal 26 is equal to the number of status bits held in the shift register 22. As a consequence, the entire contents of the shift register 22 is purged at the end of each burst of the serial clock signal 26 such that all the old status information is gone. Such clock burst purging eliminates the need for a reset signal to the shift register 22 which saves more output pins on the communication control chip 20.

The communication control chip 20 manipulates the serial clock signal such that the time interval between time t1 and t3 corresponds to a status update interval T. The status update interval T is programmable within the communication control chip 20 and determines the length of time between times t2 and t3 wherein the control chip 20 stops the serial clock signal on the signal line 26. The status update interval T may be adjusted such that a user is able to perceive illumination in the individual LEDs D1–Dn at a particular update rate. For example, the status update interval T may be set between 50 and 100 milliseconds which provides a sufficient update rate such that the user perceives changes in the LEDs D1–Dn while still obtaining updated information at a sufficient rate.

The period or cycle time of the serial clock signal 26 is preselected to be fast enough so that the transitions of the data signal 24 down through the shift register 22 is not perceptible to one viewing the LEDs D1–Dn.

Figure 4:
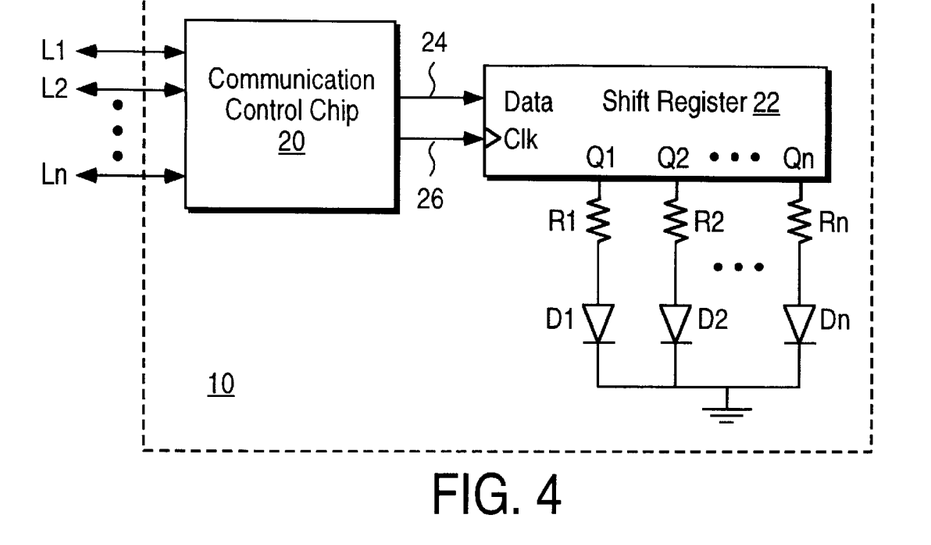
FIG. 4 illustrates another embodiment of the serial display drive circuitry of the repeater hub.

FIG. 4 illustrates another embodiment of the serial display drive circuitry of the repeater hub 10. As in the previous embodiment, the serial display drive circuitry in the repeater hub 10 includes the shift register 22, the LEDs D1–Dn, and the resistors R1–Rn. However, a set of non-inverted outputs Q1 through Qn control the on/off or illuminate/non-illuminate states of the LEDs D1–Dn in this alternative embodiment.

The communication control chip 20 generates the serial data stream on the signal line 24 and the serial clock signal on the signal line 26 with substantially similar timing as in the previous embodiment. The signal lines 24 and 26 are driven by a pair of output pins of the communication control chip 20. The serial clock signal 26 loads or shifts the serial data stream on the signal 24 into the shift register 22 such that the outputs Q1 through Qn reflect the data stored in the shift register 22. The LEDs D1–Dn are coupled between the outputs Q1 through Qn of the shift register 22 and a low voltage common or ground node.

A bit of the serial data stream that corresponds to a logical "1" or a high voltage level on the signal line 24 causes the corresponding output Q1 through Qn of the shift register 22 to transition to a high voltage level while a bit of the serial data stream that corresponds to a logical "0" or a low voltage level on the signal line 24 causes the corresponding output Q1 through Qn to transition to a low voltage level.

The outputs Q1 through Qn of the shift register 22 having a high voltage level cause electrical current flow through the corresponding LEDs D1–Dn between the high voltage outputs Q1 through Qn and the common node. The electrical current flow illuminates the corresponding LEDs D1–Dn. The resistors R1–Rn limit the electrical current flow and protect the LEDs D1–Dn from excess current damage. The outputs Q1 through Qn having a low voltage level do not cause electrical current flow and do not illuminate the corresponding LEDs D1–Dn.

Figure 5:
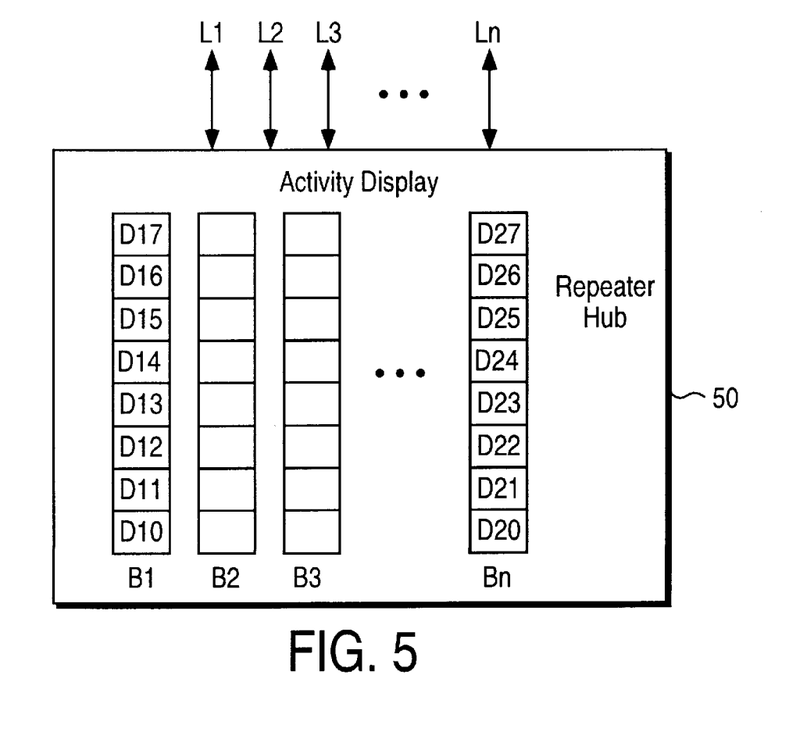
FIG. 5 illustrates a repeater hub with a link activity display that includes a set of bar graphs.

FIG. 5 illustrates a repeater hub 50 with an activity display that includes a set of bar graphs. The bar graphs of the link activity display are referred to as bar graph B1 through bar graph Bn. Each bar graph B1–Bn includes a set of LEDs. For example, the bar graph B1 includes a set of LEDs D10–D17. Similarly, the bar graph Bn includes a set of LEDs D20–D27. The individual bar graphs B1–Bn indicate the utilization of the corresponding communication link L1–Ln.

Figure 6:
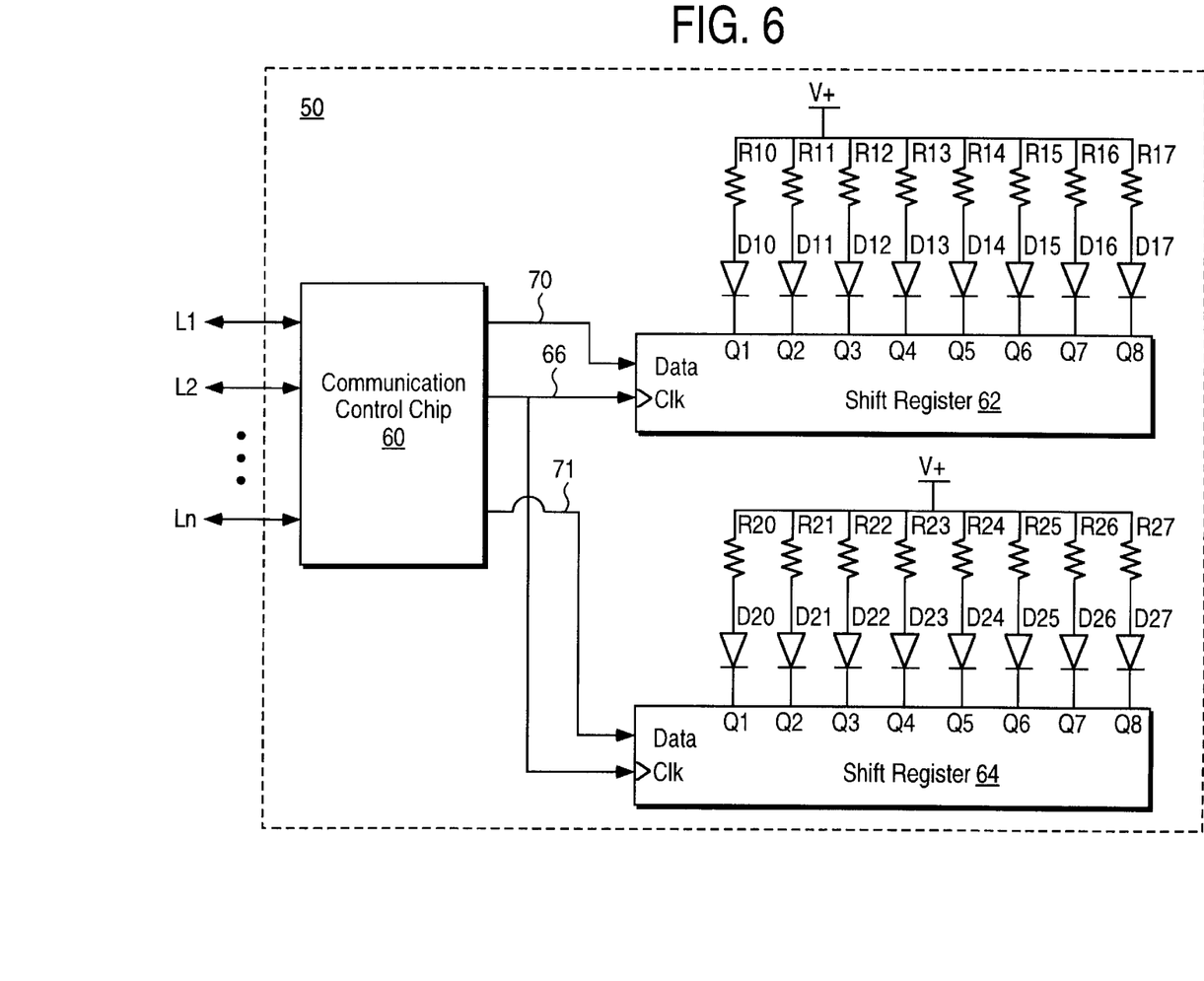
FIG. 6 illustrates the serial link activity display drive circuitry in one embodiment.

FIG. 6 illustrates the serial link activity display drive circuitry in the repeater hub 50 in one embodiment. The serial link activity display drive circuitry includes a shift register along with a set of bar graph LEDs coupled in series with current limiting resistors for each of the bar graphs B1–Bn. For example, a shift register 62, the LEDs D10–D17, and a set of resistors R10–R17 correspond to the bar graph B1. Similarly, a shift register 64, the LEDs D20–D27, and a set of resistors R20–R27 correspond to the bar graph Bn.

The shift registers 62 and 64 each provide a set of outputs Q1 through Qn that control the on/off or illuminate/non-illuminate states of the LEDs D10–D17 and D20–D27, respectively. The LEDs D10–D17 are coupled between the outputs Q1 through Q8 of the shift register 62 and the supply voltage V+. Similarly, The LEDs D20–D27 are coupled between the outputs Q1 through Q8 of the shift register 64 and the supply voltage V+. The resistors R10–R17 and R20–R27 limit the electrical current flow and protect the LEDs D10–D17 and D20–D27 from excess current damage.

The repeater hub 50 includes a communication control chip 60 that provides communication functions via the communication links L1–Ln and that provides bar graph displays through the display drive circuitry. The communication control chip 60 generates a data signal for each of the bar graphs B1–Bn including a data signal 70 for the bar graph B1 and a data signal 71 for the bar graph Bn. The communication control chip 60 also generates a serial clock signal 66. The communication control chip 60 manipulates the data signals 70–71 and the clock signal 66 to provide illuminated bar graph displays via the LEDs D10–D17 and D20–D27. The signal lines 70 and 71 and the signal line 66 are each driven by a separate output pin of the communication control chip 60. The arrangement shown includes only one data pin on the communication control chip 60 per bar graph display and eliminates the need for extra strobe signal and latches to hold bar graph data that would increase system cost.

The rising edges of the serial clock signal 66 shift the data signals 70 and 71 into the shift registers 62 and 64, respectively. The outputs Q1 through Q8 of the shift register 62 having a low voltage level cause the illumination of the corresponding LEDs D10–D17. The illumination results from electrical current flow through the LEDs D10–D17 between the V+ supply and the low outputs Q1 through Q8 of the shift register 62. Similarly, the outputs Q1 through Q8 of the shift register 64 having a low voltage level cause the illumination of the corresponding LEDs D20–D27. The outputs Q1 through Q8 of the shift registers 62 and 64 having a high voltage level do not cause electrical current flow through the corresponding LEDs and therefore do not contribute to the bar graph displays.

Figure 7:
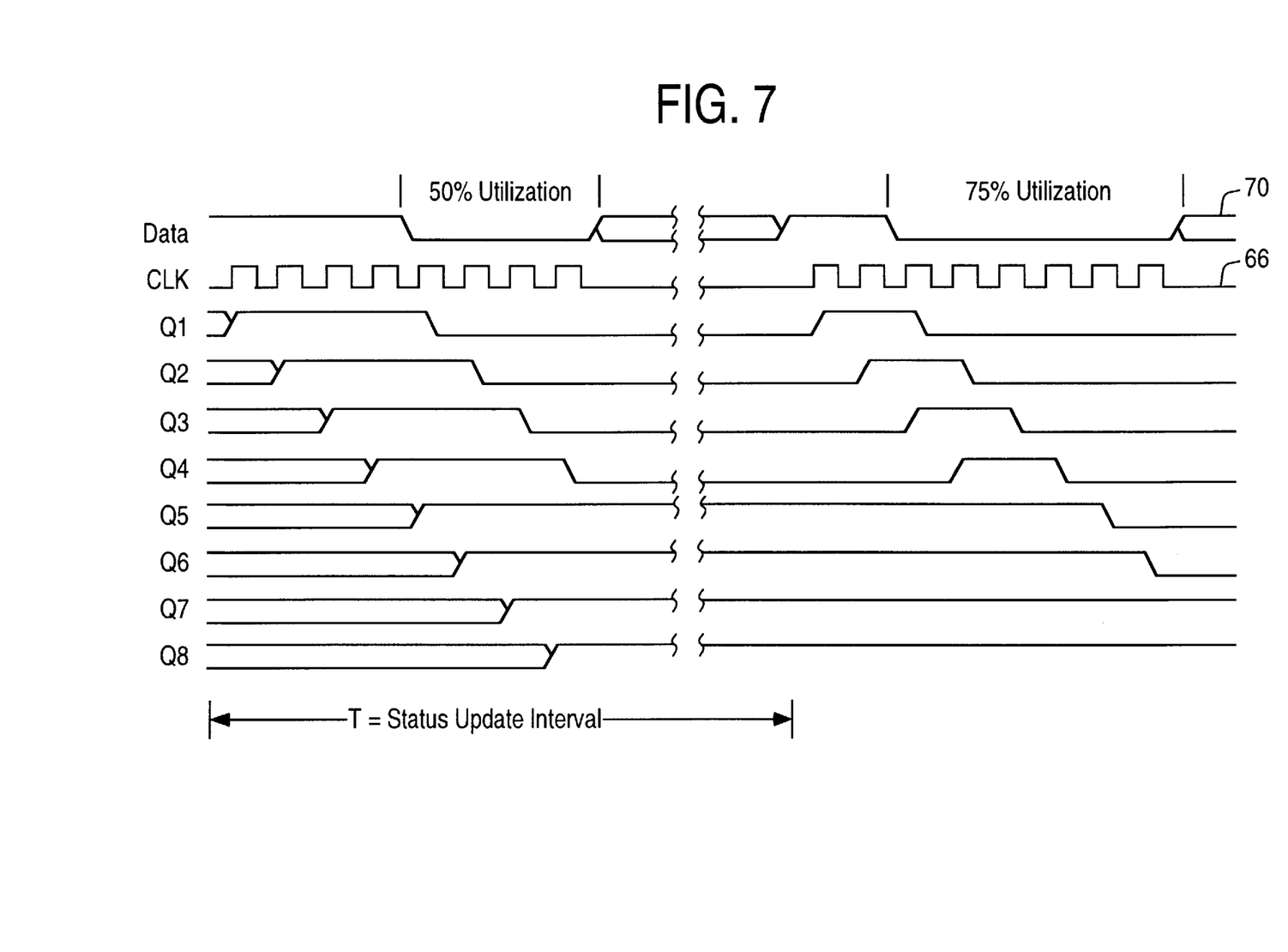
FIG. 7 illustrates the timing of the serial clock signal (CLK) and the data (DATA) signal that manipulate a bar graph display.

FIG. 7 illustrates the timing of the serial data signal (DATA) on the signal line 70 and the serial clock signal (CLK) 66. The communication control chip 60 generates groups of serial clock pulses on the signal line 66 along with corresponding bar graph data on the signal line 70. The groups or bursts of serial clock pulses are spaced by a time interval T which defines a status update interval for the bar graph B1.

In the example shown, a first group of clock pulses starts at time t9 and ends at time t11. A second group of clock pulses starts at time t11a and ends at time t13. The status update interval T between time t9 and time t11a determines the fastest rate at which the LEDs D10–D17 switch on or off. The status update interval T is preselected to provide sufficient time for the human eye to perceive changes in the illumination of the LEDs D10–D17.

The communication control chip 60 asserts the serial data signal 70 high during the first four serial clock pulses of the burst starting at time t9 on the signal line 66. As a consequence, the first four clock pulses shift four consecutive ones into the shift register 62. The communication control chip 60 asserts the serial data signal 70 low during the last four serial clock pulses of the burst ending at time t11 which shifts four consecutive zeros into the shift register 62.

At time t11, the communication control chip 60 stops the burst of clock pulses and the shift register outputs Q1–Q4 have a low voltage level and the outputs Q5–Q8 have a high voltage level. The low voltage level of the outputs Q1–Q4 cause the illumination of the LEDs D10–D13 and the high voltage level of the outputs Q5–Q8 switch off the LEDs D14–D17. In this example, the illumination of only the LEDs D10–D13 indicates a greater than 50% utilization of the corresponding communication link L1. The LEDs D10–D13 remain illuminated and the LEDs D14–D17 remain off at least until time t11a according to the status update interval.

In response to status changes on the communication link L1, the communication control chip 60 asserts the serial data signal 70 high during the first two serial clock pulses of the burst starting at time t11a. The first two clock pulses shift two consecutive ones into the shift register 62. The communication control chip 60 asserts the serial data signal 70 low during the last six serial clock pulses ending at time t13 which shifts six concecutive zeros into the shift register 62.

At time t13, the communication control chip 60 stops the clock burst. The shift register outputs Q1–Q6 have a low voltage level and the outputs Q7–Q8 have a high voltage level which switches on the LEDs D10–D15 and switches off the LEDs D16–D17. In this example, the illumination of the LEDs D10–D15 indicates a greater than 75% utilization of the corresponding communication link L1.

The frequency of pulses of the serial clock signal 66 between times t9–t11 and between times t11a–t13 is preselected to prevent the human eye from perceiving skew between changes in the illumination of the LEDS D10–D17.

Figure 8:
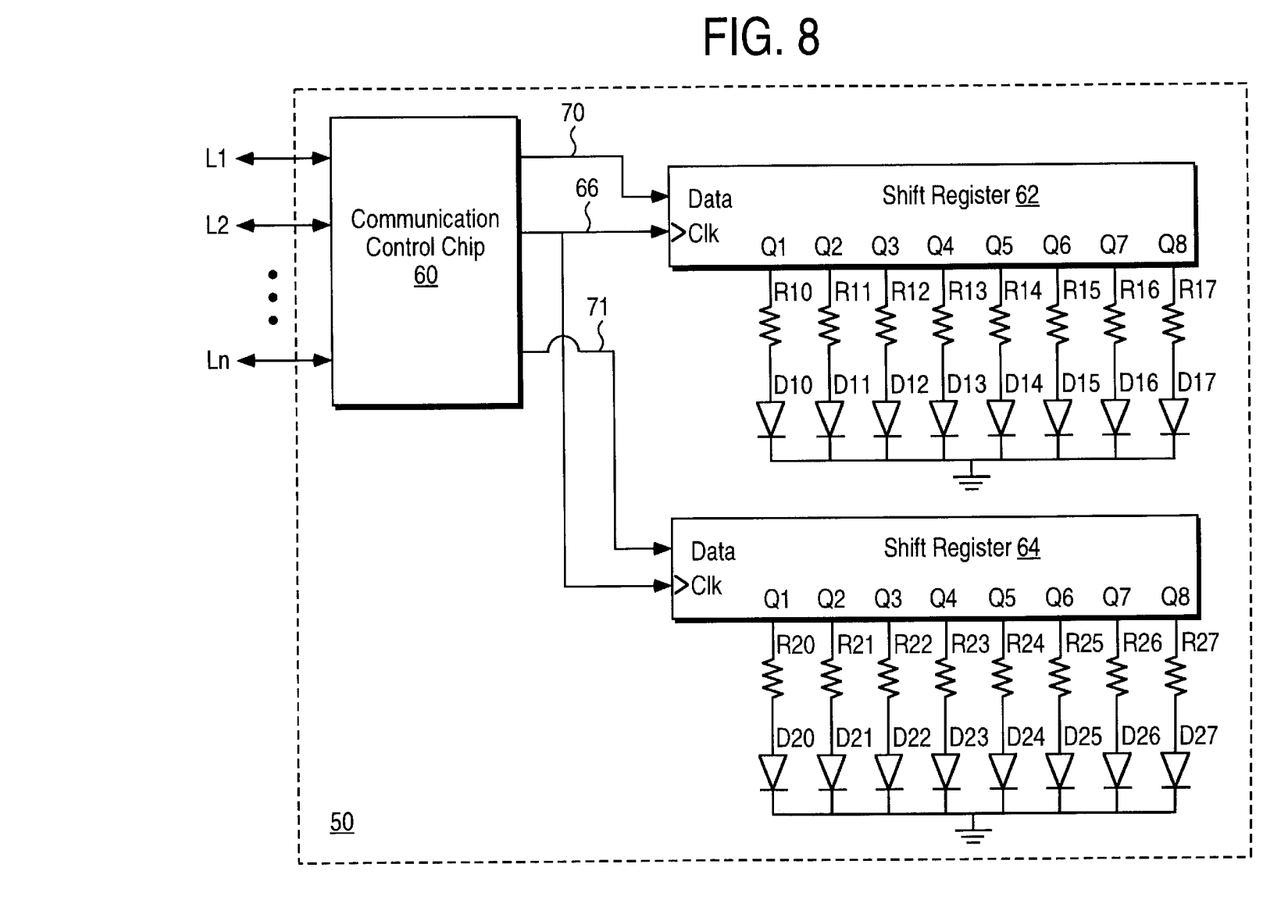
FIG. 8 illustrates the serial link activity display drive circuitry in another embodiment.

FIG. 8 illustrates the serial link activity display drive circuitry in the repeater hub 50 in another embodiment. This embodiment includes a shift register along with a set of bar graph LEDs in series with current limiting resistors for each of the bar graphs B1–Bn. However, the output polarities that drive the bar graphs B1–Bn are reversed.

For example, the shift registers 62 and 64 each provide a set of outputs Q1 through Qn that control the on/off or illuminate/non-illuminate states of the LEDs D10–D17 and D20–D27, respectively. The LEDs D10–D17 are coupled between the outputs Q1 through Q8 of the shift register 62 and a common node. Similarly, The LEDs D20–D27 are coupled between the outputs Q1 through Q8 of the shift register 64 and the common node. The resistors R10–R17 and R20–R27 limit the electrical current flow and protect the LEDs D10–D17 and D20–D27 from excess current damage.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A serial display drive for an electronic system, comprising:
control circuitry for the electronic system that generates a serial data stream carrying a set of status information and further generating a serial clock signal that synchronizes each of a plurality of status bits in the serial data stream;
a set of indicating elements for displaying the status information;
means for switching the indicating elements such that an on/off state of each indicating element is controlled by a corresponding status bit in the serial data stream;
wherein:
the serial clock signal determines a status update interval for each of the indicating elements; and
said status bits are input directly from the serial data stream to the indicating elements.

2. The serial display drive of claim 1, wherein each indicating element comprises a light-emitting diode.

3. The serial display drive of claim 1, wherein the control circuitry is contained on an integrated circuit chip having an output pin that provides the serial data stream and having another output pin that provides the serial clock signal.

4. The serial display drive of claim 1, wherein the electronic system is an communication repeater hub.

5. The serial display drive of claim 4, wherein the communication repeater hub enables communication among a plurality of ethernet communication links.

6. The serial display drive of claim 1, wherein the means for switching on the indicating elements comprises a shift register having a data input coupled to receive the serial data stream and having a clock input coupled to receive the serial clock signal.

7. The serial display drive of claim 6, wherein the shift register provides a set of outputs that drive the indicating elements.

8. The serial display drive of claim 7, wherein the indicating elements are coupled between the outputs and a voltage supply node of the electronic system.

9. The serial display drive of claim 1, wherein each indicating element comprises at least one of a liquid crystal display element and an incandescent bulb.

10. The serial display drive of claim 7, wherein the indicating elements are coupled between the non-inverted outputs and a low voltage common node of the electronic system.

11. A serial display drive for an electronic system, comprising:
control circuitry for the electronic system that generates a serial data signal for each of a set of bar graphs such that each serial data signal provides a status indication, the control circuitry further generating a serial clock signal including bursts of clock pulses separated by a status update interval for the bar graphs;
a set of indicating elements for each bar graph that display the status indications;
means for switching the indicating elements such that an on/off state of the indicating elements of each bar graph is determined by the corresponding serial data signal and the on/off state is held for the status update interval;
wherein each status indication is input directly from the corresponding serial data signal to the indicating elements of the corresponding bar graph.

12. The serial display drive of claim 11, wherein the status update interval is preselected to enable perception of changes in the status indications.

13. The serial display drive of claim 11, wherein a frequency of the clock pulses is preselected to prevent perception of skew among changes in the on/off state of the bar graphs.

14. The serial display drive of claim 11, wherein each indicating element comprises a light-emitting diode or a liquid crystal display element or an incandescent bulb.

15. The serial display drive of claim 11, wherein the control circuitry is contained on an integrated circuit chip having a serial data output pin for each bar graph.

16. The serial display drive of claim 11, wherein the electronic system is an communication repeater hub.

17. The serial display drive of claim 16, wherein the communication repeater hub enables communication among a plurality of ethernet communication links.

18. The serial display drive of claim 11, wherein the means for switching the indicating elements comprises a set of shift registers having a data input coupled to one of the corresponding serial data signals and each having a clock input coupled to receive the serial clock signal.

19. The serial display drive of claim 18, wherein each shift register provides a set of outputs that drive the corresponding indicating elements.

20. The serial display drive of claim 19, wherein the indicating elements are coupled between the outputs and a voltage supply node of the electronic system.

21. The serial display drive of claim 19, wherein the indicating elements are coupled between the outputs and a low voltage common node of the electronic system.

22. A serial status display for an electronic system, comprising:
a communication control device that generates a serial data stream carrying status bits, and
a serial clock signal synchronized with said serial data stream;
indicating elements for displaying said status bits; and
a switching device configured to switch said indicating elements such that an on/off state of each indicating element is controlled by a corresponding status bit in the serial data stream and each status bit is input directly from said serial data stream to the corresponding indicating element.

23. The serial status display according to claim 22, wherein:
said communication control device is contained on an integrated circuit chip having first and second output pins;
said first output pin provides said serial data stream; and
said second output pin provides said serial clock signal.

24. The serial status display according to claim 23, wherein said switching device comprises,
a shift register having a data input coupled to said first output pin of said integrated circuit to receive said serial data stream, and
a clock input coupled to said second output pin of said integrated circuit to receive said serial clock signal.

25. The serial status display according to claim 24, wherein said shift register includes a set of outputs that drive said indicating elements.

26. A serial status display for an electronic system, comprising:
a communication control device that generates a serial data stream carrying status bits, and
a serial clock signal synchronized with said serial data stream;
indicating elements for displaying said status bits; and
a switching device configured to switch said indicating elements such that an on/off state of each indicating element is controlled by a corresponding status bit in the serial data stream;
wherein:
said communication control device is contained on an integrated circuit chip having first and second output pins;
said first output pin provides said serial data stream;
said second output pin provides said serial clock signal;
said switching device comprises,
a shift register having a data input coupled to said first output pin of said integrated circuit to receive said serial data stream, and
a clock input coupled to said second output pin of said integrated circuit to receive said serial clock signal, wherein said shift register includes a set of outputs that drive said indicating elements;
said serial data stream is divided into groups of status bits, each group of status bits reflecting status information for a predetermined time period; and
each group of status bits is shifted into and then held in said shift register for a status update interval.

27. The serial status display according to claim 26, wherein said status update interval is a predetermined programable time period of sufficient length to allow each group of status bits displayed by said indicating elements to be perceived by a user.

28. The serial status display according to claim 27, wherein said status update interval is between 50 and 100 milliseconds.

29. The serial status display according to claim 27, wherein:
said status update interval is divided into a shift period and a hold period;
said shift period defining a time interval in which a respective group of status bits is shifted into said shift register;
said hold period defining a time interval in which said respective group of status bits are held in said shift register;
said communication control device operates said serial clock signal in a burst mode during said shift period such that a number of clock cycles in each burst is equal to a number of status bits in said respective group of status bits; and
said communication control device stops said serial clock signal during said hold period.

30. The serial status display of claim 29, wherein:
said shift period is a limited time interval such that transitions of said indicating elements corresponding to status bits being shifted into said shift register are not perceptible to a user viewing said indicating elements; and
said hold period is a time interval of sufficient length such that a user viewing said indicating elements can perceive said indicating elements at a predetermined update rate.

31. The serial status display of claim 30, wherein said status update interval is between 50 and 100 milliseconds.

32. The serial status display of claim 31, wherein:
said electronic system is a repeater hub; and
each status bit indicates an attribute of said repeater hub.

33. The serial status display of claim 32, wherein said attribute is collisions that have occurred on a communication link of said repeater hub.

34. A serial status display, comprising:
a communication control device that generates plural serial data streams of status bits;
a serial clock signal synchronized with each of said serial data streams;
plural sets of indicating elements; and
plural switching devices, each configured to switch a respective one of said indicating element sets in accordance with the status bits of a corresponding serial data stream;
wherein said status bits of each corresponding serial data stream are input directly from the corresponding serial data stream to each respective indicating element set.

35. The serial status display according to claim 34, wherein:
said communication control device includes plural data outputs, each configured to provide one of said serial data streams, and a clock output that provides said serial clock signal; and each switching device comprises, a shift register having a data input coupled to a respective data output of said communication control device, a clock input coupled to said clock output, and a set of outputs configured to drive the indicating element set corresponding to the serial data stream output by said respective data output.

36. The serial status display drive according to claim 35, wherein:

each serial data stream is divided into groups of status bits, each group reflecting status information for a predetermined time period;

one group of status bits from each serial data stream is shifted into and then held by a corresponding shift register for a status update interval; and said status update interval is a repeating programmable time period of sufficient length to allow each group of status bits to be perceived in said indicating elements by a user.

37. The serial status display according to claim 36, wherein:

said status update interval is divided into a shift period and a hold period;

said shift period defining a time interval in which said groups of status bits from each serial data stream are shifted into said corresponding shift registers;

said hold period defining a time interval in which said groups of status bits are held in each corresponding shift register;

said communication control device operates said serial clock signal in a burst mode during said shift period such that a number of clock cycles in each burst is equal to a number of status bits in each group; and said communication control device stops said serial clock signal during said hold period.

38. The serial status display of claim 37, wherein:

said shift period is a limited time interval such that transitions of said indicating elements corresponding to status bits being shifted into each corresponding shift register are not perceptible to a user viewing said indicating elements;

said hold period is a time interval of sufficient length such that a user viewing said indicating elements can perceive said indicating elements at a predetermined update rate; and said status update interval is between 50 and 100 milliseconds.

39. The serial status display of claim 38, wherein:

said electronic system is a repeater hub;

said status bits in at least one of said plural serial data streams are arranged in bar graph format and indicate at least one attribute of said repeater hub; and each indicating element set corresponding to said at least one serial data stream arranged in bar graph format is configured as a bar graph display.

40. The serial status display of claim 39, wherein said at least one attribute includes utilization of at least one communication link of said repeater hub.

41. A method of displaying status for a device, comprising the steps of:

generating plural serial data streams of status bits;

generating a clock signal that is synchronized with each of said plural serial data streams;

dividing each of said plural serial data streams into groups of status bits, each group representing status for a predetermined time period;

shifting, in synchronization with said clock signal, one group of status bits from each of said plural serial data streams into plural shift registers each corresponding to one of said plural serial data streams;

holding each group of status bits shifted into said shift registers for a predetermined time period;

displaying said status bits via plural sets of indicating elements each set attached to outputs of one of said shift registers, wherein said status bits are input directly from said plural serial data streams into corresponding of said plural sets of indicating elements; and repeating, continuously, said steps of shifting, holding, and displaying.

42. The method according to claim 41, further comprising the steps of:

limiting a time period for performing said step of shifting such that transitions of said indicating elements caused by shifting of status bits is not perceptible to a user viewing said indicating elements;

adjusting said predetermined time period such that status bits shifted into said shift registers are perceptible to a user viewing said indicating elements; and performing said steps of shifting, holding, and displaying during a programmable status update interval of between 50 and 100 milliseconds.

43. The method according to claim 42, further comprising the step of:

placing link utilization information for at least one communications link channel of a repeater hub into the status bits of at least one of said plural serial data streams.

44. The method according to claim 43, further comprising the steps of:

arranging said status bits in at least one of said serial data streams in a form suitable for display on a bar graph; and configuring at least one of said plural sets of indicating elements as a bar graph display.

\* \* \* \* \*